(12) United States Patent
Yamakado et al.

(10) Patent No.: US 7,426,295 B2
(45) Date of Patent: Sep. 16, 2008

(54) GENERATION OF DECORATIVE PICTURE SUITABLE FOR INPUT PICTURE

(75) Inventors: Hitoshi Yamakado, Nagano-ken (JP); Toru Miyamoto, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 756 days.

(21) Appl. No.: 10/956,476

(22) Filed: Oct. 1, 2004

(65) Prior Publication Data

US 2005/0141771 A1 Jun. 30, 2005

(30) Foreign Application Priority Data

Oct. 2, 2003 (JP) ............... 2003-344058

(51) Int. Cl.
*G06K 9/00* (2006.01)

(52) U.S. Cl. ............ 382/162; 382/165; 382/167

(58) Field of Classification Search ......... 382/162, 382/165, 167; 358/1.18, 540; 345/473, 634
See application file for complete search history.

(56) References Cited

U.S. PATENT DOCUMENTS 6,034,785 A * 3/2000 Itoh ............ 358/1.18
6,072,914 A * 6/2000 Mikuni ......... 382/284
6,686,919 B1 * 2/2004 Kanetaka et al. ...... 345/473

FOREIGN PATENT DOCUMENTS

JP 09-134159 5/1997
JP 10-320576 12/1998
JP 2002-300363 10/2002

OTHER PUBLICATIONS

Abstract of Japanese Patent Publication No. 10-320576, Pub. Date: Dec. 4, 1998, Patent Abstracts of Japan.
Abstract of Japanese Patent Publication No. 2002-300363, Pub. Date: Oct. 11, 2002, Patent Abstracts of Japan.
Abstract of Japanese Patent Publication No. 09-134159, Pub. Date: May 20, 1997, Patent Abstracts of Japan.

* cited by examiner

*Primary Examiner*—Phuoc Tran
(74) *Attorney, Agent, or Firm*—Martine Penilla & Gencarella, LLP

(57) ABSTRACT

The invention provides a technique for generating a decorative image to be added to an input image which are suitable for input images. The data structure 300 of decorative image data representing the decorative image to be added to the input image by means of an image processing apparatus comprises an element image storage portion for storing color element image data representing image constituting at least some of the area of the decorative image. The element image storage portion stores a non-rewritable MIB representing whether modification of image representation components included in the color element image data is permitted by the image processing apparatus.

11 Claims, 11 Drawing Sheets

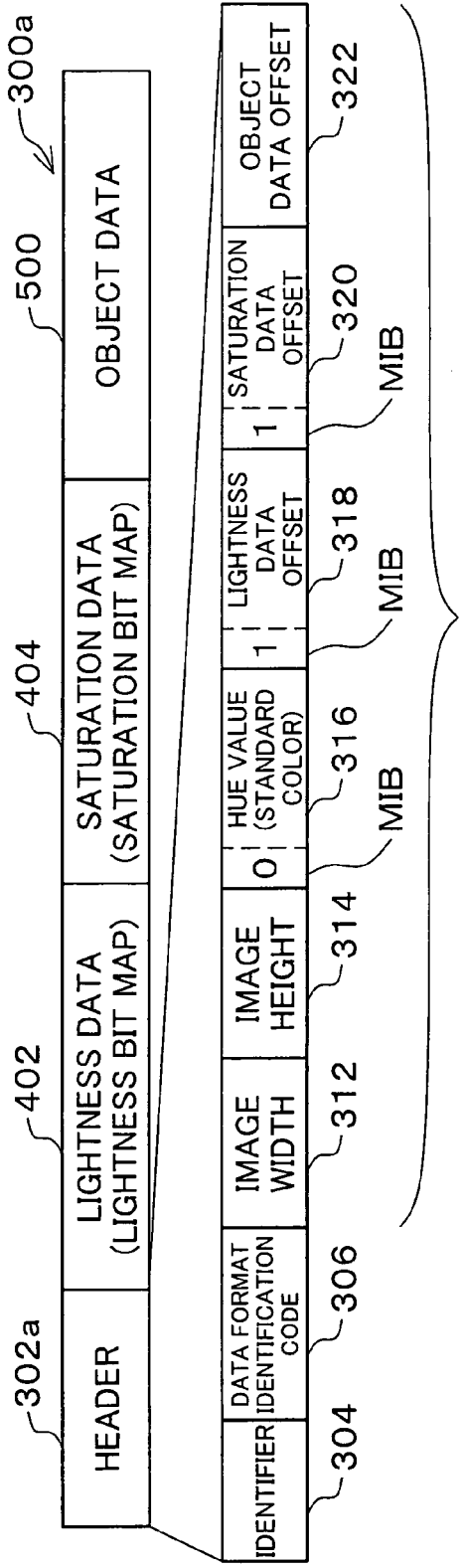
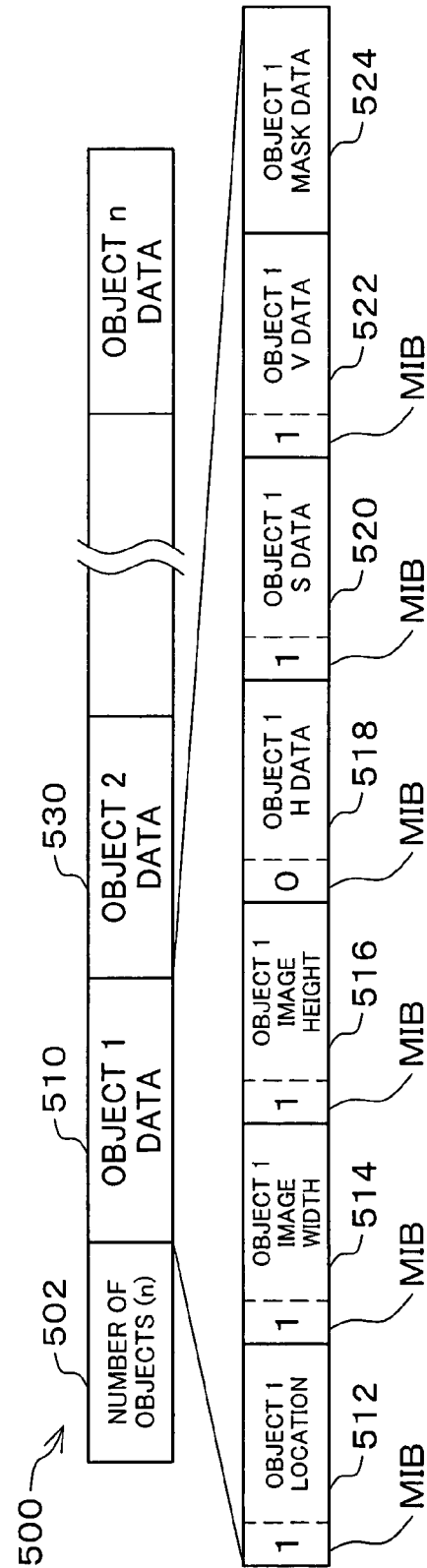
Fig.6(a)
Fig.6(b)

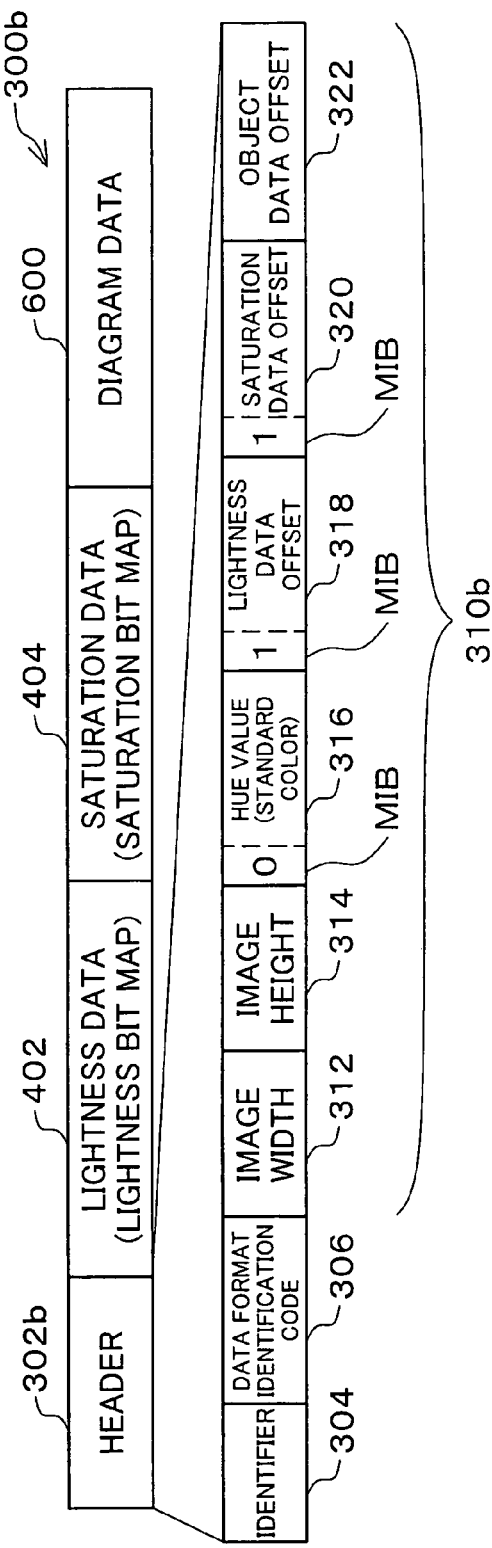
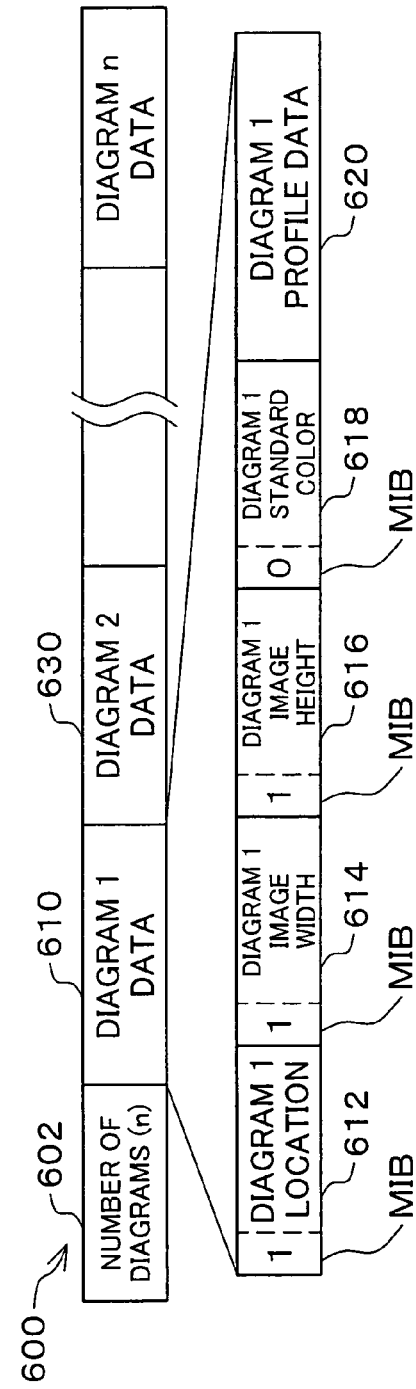
Fig.8(a)
Fig.8(b)

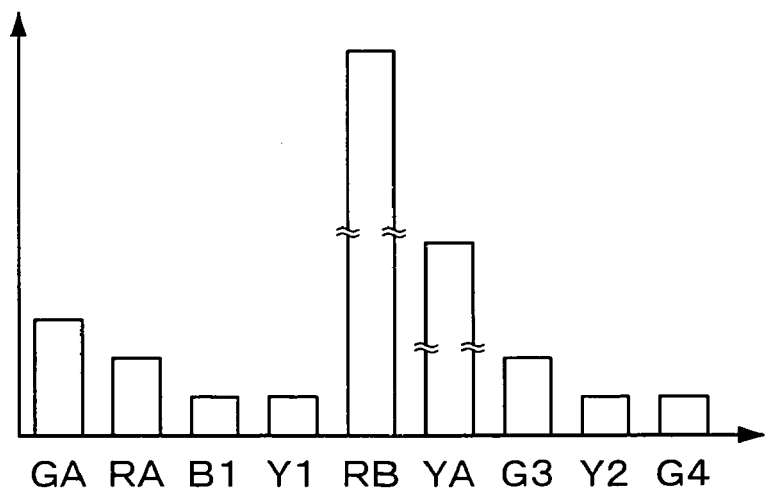

GENERATION OF DECORATIVE PICTURE SUITABLE FOR INPUT PICTURE

CROSS-REFERENCE TO RELATED APPLICATIONS

The present application claims the priority based on Japanese Patent Application No. 2003-344058 filed on Oct. 2, 2003, the disclosure of which is hereby incorporated herein by reference in its entirety.

BACKGROUND OF THE INVENTION

1. Field of the Invention

The present invention relates to a technique for generating a decorative image which is added to an input image according to the input picture.

2. Description of the Related Art

When an image input from an image input device such as a digital still camera are output to an image output device such as a display or printer, a decorative image may be added to the input image. Such decorative image is selected from a plurality of decorative images with different color tones which is prepared in advance. Users may select one from them through the user's own judgment based on features of the input image such as color tone.

However, in order to ensure that the color tone of the decorative image is consistent with the color tone of the input image, many decorative images should be prepared. Since the number of decorative images which can be stored on recording medium is limited, it is sometimes impossible to obtain a decorative image with a pattern and color tone suitable for the input image and to achieve optimal output effects.

SUMMARY OF THE INVENTION

An object of the present invention is to generate a decorative image which is added to an input image according to the input image.

In order to solve at least part of the above object, a data structure according to the present invention is a decorative image data structure representing a decorative image to be added to an input image by means of an image processing apparatus. The decorative image data structure comprises: an element image storage portion for storing color element image data representing a color element image, which are color images constituting at least partial area of the decorative image, wherein the color element image data comprises a plurality of image representation components, and the element image storage portion stores a non-rewritable attribute representing whether modification of the image representation components for at least one color element image is permitted for the image processing apparatus.

In this arrangement, since image representation components may be modified when needed, generation of a decorative image suitable for the input image is possible.

The invention can be realized in a variety of embodiments, such as a image processing method and image processing apparatus, device and or method for controlling a image processing apparatus, computer programs and data structures for executing the functions of a control device or method, recording media on which are recorded such computer programs or data structures, and data signals embodied in carrier waves, including such computer programs or data structures.

These and other objects, features, aspects, and advantages of the present invention will become more apparent from the following detailed description of the preferred embodiments with the accompanying drawings.

BRIEF DESCRIPTION OF THE DRAWINGS

FIGS. 6(a) and 6(b) illustrate an example of the data structure 300a of the decorative image data FD representing decorative images such as in FIG. 5(a).

FIGS. 8(a) and 8(b) illustrate an example of the data structure 300b of decorative image data FD in a third embodiment.

FIGS. 11(a) through 11(e) illustrate the details of the representative colors acquiring process.

DESCRIPTION OF THE PREFERRED EMBODIMENT

Preferred embodiments of the invention are illustrated with examples in the following order.
A. First Embodiment
B. Second Embodiment
C. Third Embodiment
D. Acquisition of Representative Colors
E: Variants

A. First Embodiment

Figure 1:
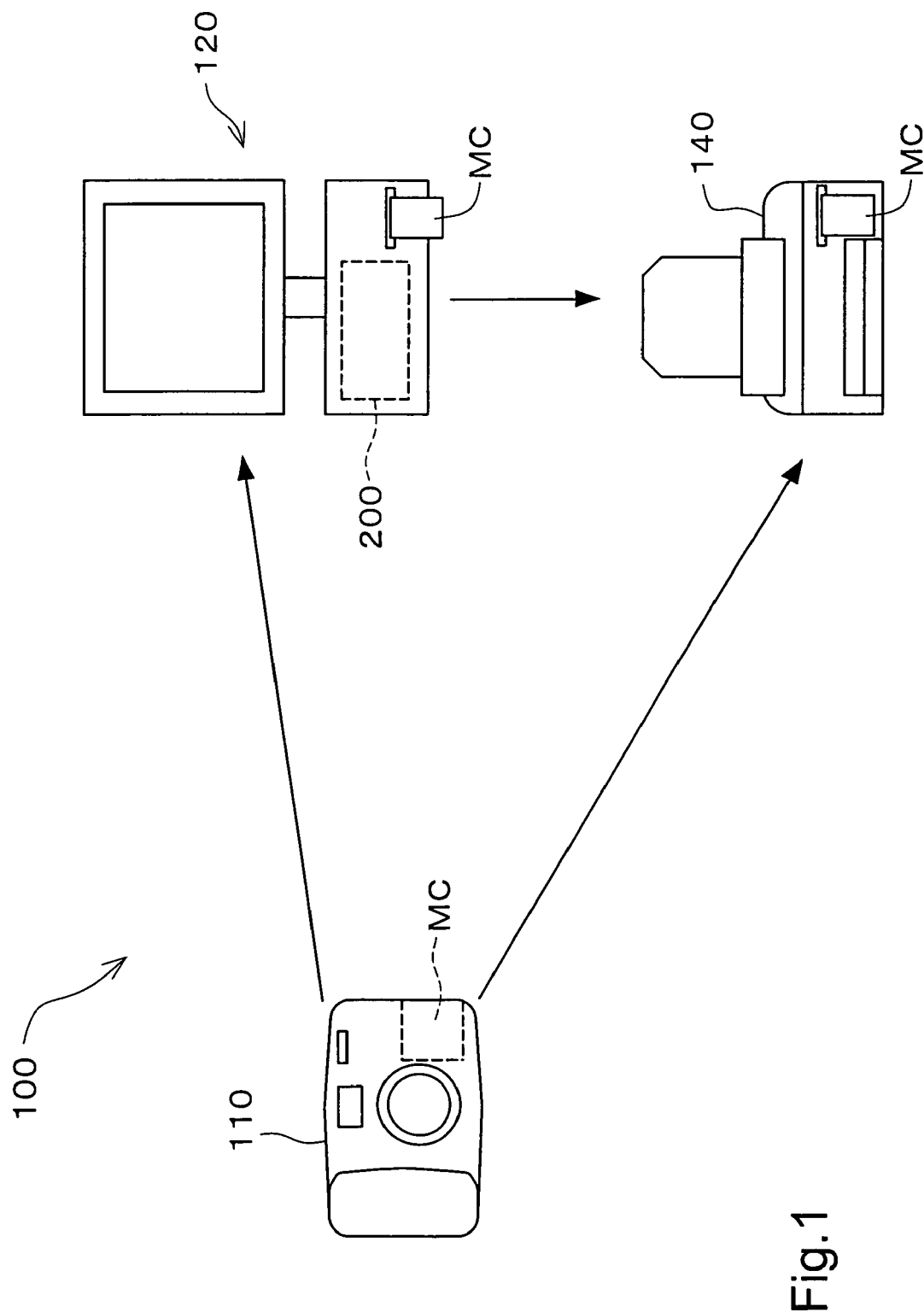
FIG. 1 illustrates an image processing system 100 as an example of the invention.

FIG. 1 illustrates an image processing system 100 as an example of the invention. The image processing system 100 comprises a digital still camera 110, personal computer 120, and color printer 140. An image processing device 200 incorporated in the personal computer 120 generates output images from input images represented by image data created by the digital still camera 110. The image quality of the output images that are generated are adjusted by operating the image processing device 200. Output images with adjusted image quality are output by the color printer 140, which is the output device.

The image processing device 200 is incorporated in the personal computer 120 in this embodiment, but the image processing device 200 can also be incorporated in the color printer 140, and the image processing device 200 may also be incorporated in the digital still camera 110.

Figure 2:
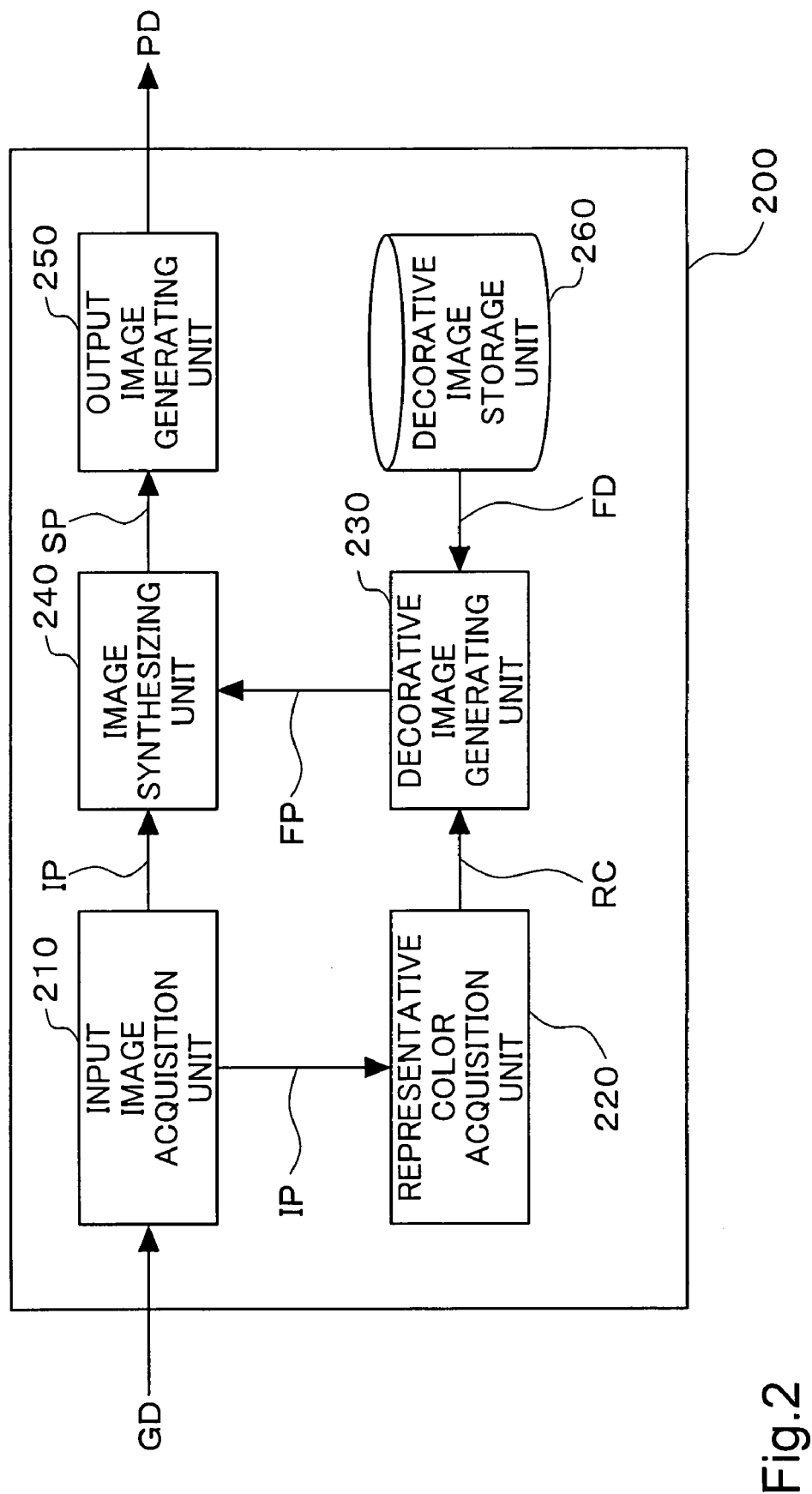
FIG. 2 is a block diagram of the structure of the image processing apparatus 200 in the first embodiment.

FIG. 2 is a block diagram of the structure of the image processing apparatus 200 in the first embodiment. The image processing apparatus 200 comprises an input image acquisition unit 210, representative color acquisition unit 220, decorative image generating unit 230, image synthesizing unit 240, output image generating unit 250, and decorative image storage unit 260.

The input image acquisition unit 210 acquires an input image IP from the image data GD. The representative color acquisition unit 220 acquires a representative color of the input image IP by analyzing the input image IP that has been acquired. The representative color RC thus obtained are supplied by the representative color acquisition unit 220 to the decorative image generating unit 230. A specific method for obtaining a representative color RC is described below.

The decorative image generating unit 230 receives decorative image data FD from the decorative image storage unit 260. The decorative image data FD thus received is modified as needed according to the representative color RC of the input image IP, and a decorative image FP is generated. The decorative image FP thus generated is sent to the image synthesizing unit 240. The image synthesizing unit 240 synthesizes the input image IP supplied from the input image acquisition unit 210 and the decorative image FP supplied from the decorative image generating unit, and a synthesized image SP is generated.

Synthesized images SP thus obtained by the addition of the decorative image FP to the input image IP represented by the image data GD are laid out by the output image generating unit 250, to thereby generate an output image. The image quality of the output image is adjusted as needed and is then output in the form of output data (print data) PD to the printer 140.

Figure 3:
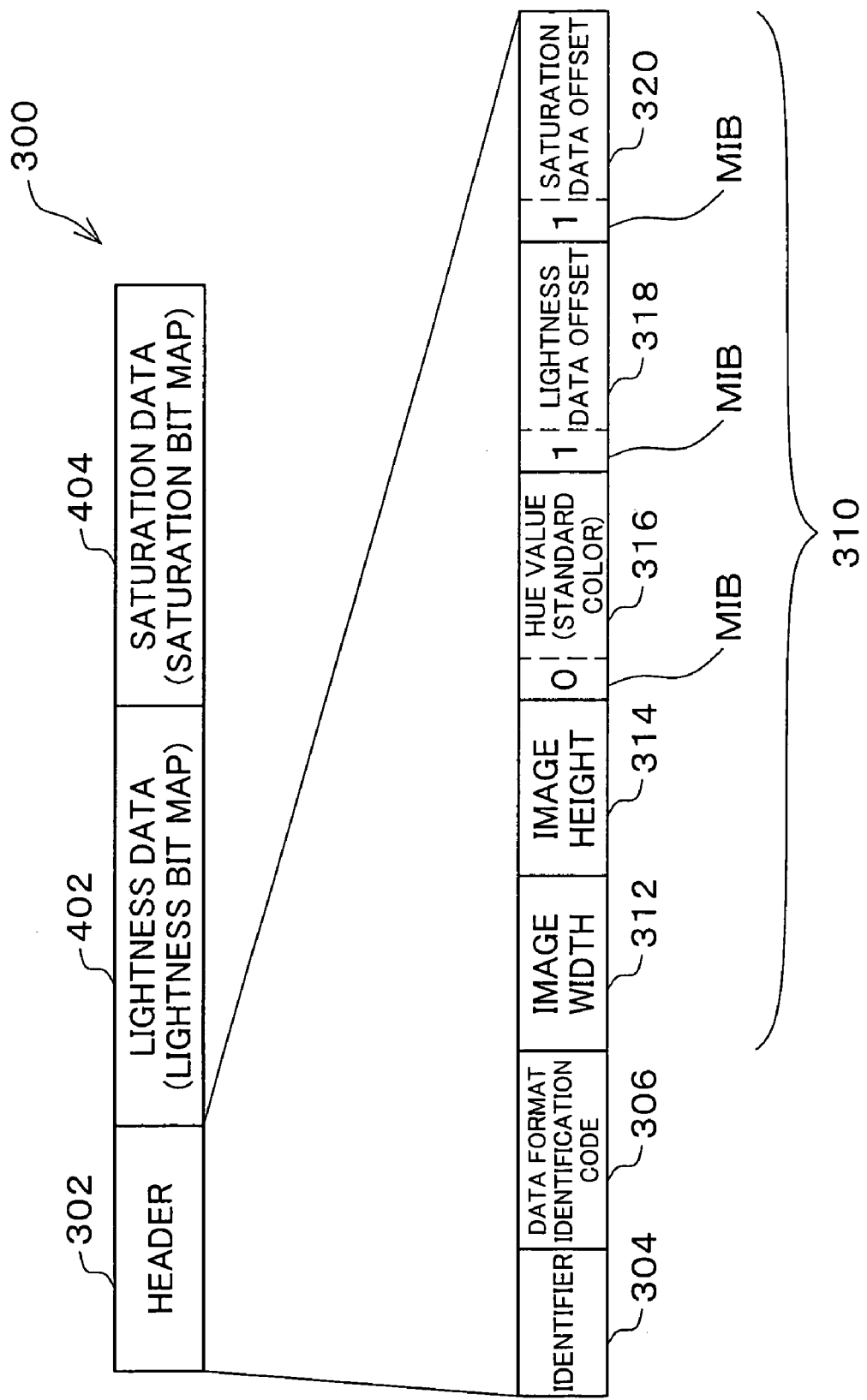
FIG. 3 illustrates the data structure 300 of the decorative image FD in the first embodiment.

FIG. 3 illustrates the data structure 300 of the decorative image FD in the first embodiment. The decorative image represented by the decorative image data FD is composed of a single color element image (referred to below as "frame image"), which is a bit map image. The frame image in the first embodiment is an image in which the hue value of all pixels in the frame image are the same, the pattern of the frame image being represented by the lightness and saturation of each pixel.

The data structure 300 comprises a header 302, frame image lightness data 402, and frame image saturation data 404. The header 302 comprises an identifier 304 indicating that the data is decorative image data FD, a data format identification code 306 indicating the data format, and attribute data 310 related to the frame image. The lightness data 402 represents the lightness (V) of each pixel when the frame image is represented in HSV (Hue, Saturation, Value) color space, and the saturation data 404 is data representing the saturation (S) of each pixel when the frame image is represented in HSV color space.

The attribute data 310 of the frame image stores the image width 312, which is the number of pixels in the horizontal direction of the frame image, the image height 314, which is the number of pixels in the vertical direction of the frame image, the hue value 316 of the frame image, the lightness data offset 318, and the saturation data offset 320. The brightness data offset 318 and saturation data offset 320 indicate where the brightness data 402 and saturation data 404 are stored. The hue value 316 of the frame image is a value that applied to the entire frame image.

In the data structure 300, modification inhibiting bits MIB are attached to the heads of each of the hue value 316, lightness data offset 318, and saturation data offset 320. The modification inhibiting bits MIB are non-rewritable data indicating whether image information to which the modification inhibiting bits MIB are attached can be modified or not. The expression "non-rewritable data" means that the data cannot be rewritten by a program for executing the functions of the decorative image generating unit.

In the first embodiment, the modification inhibiting bit MIB for the hue value 316 is 0 (modifiable), and the modification inhibiting bits MIB for the lightness data offset 318 and saturating data offset 320 are 1 (unmodifiable). The hue of the decorative image represented by the decorative image data FC in FIG. 3 can thus be modified by the decorative image generating unit 230, whereas the lightness and saturation cannot.

In this way, out of the hue value 316, lightness data 402, and saturation data 404, the hue value 316 is set by the decorative image generating unit 230. For example, the hue value 316 may be modified to the same value as the hue value of the representative color RC of the input image IP to generate a decorative image FP.

Figure 4A:
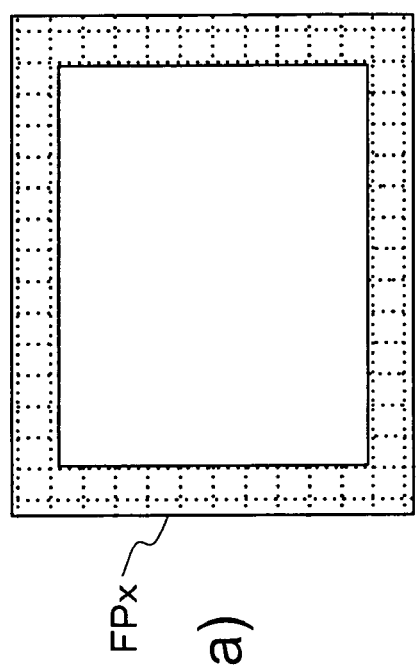
FIGS. 4(a), 4(b), and 4(c) illustrate several decorative images generated from the decorative image data FD in the first embodiment.
Figure 4C:
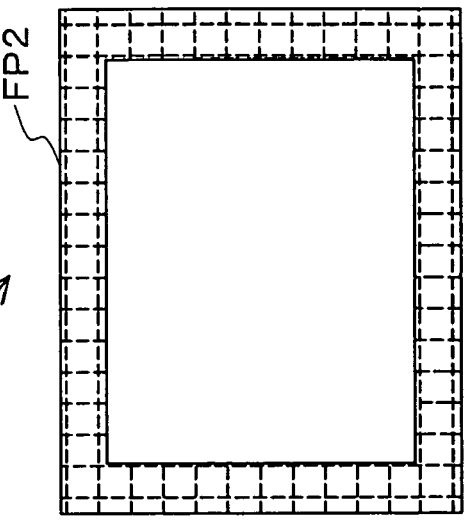
Figure 4B:
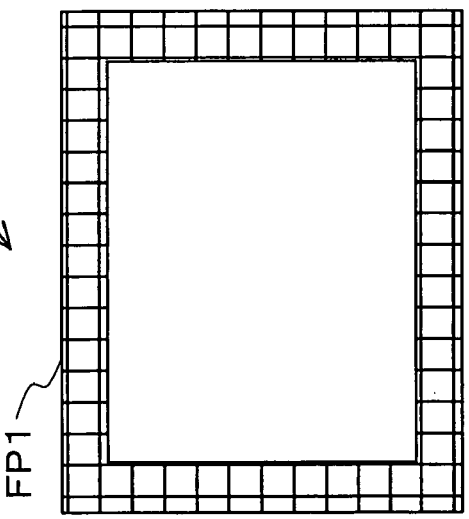

FIGS. 4(a), 4(b), and 4(c) illustrate decorative images generated from the decorative image data FD in the first embodiment. In this example, two different decorative images FP1 and FP2 are generated according to the representative colors RCa and RCb of two input images IP1 and IP2 (not shown), respectively, from one frame image FPx represented by the decorative image data FD. A blank area for fitting the input image is formed in the center of the frame image FPx (FIG. 4(a)).

In the example in FIG. 4(b), the representative color of the input image IP1 acquired by the representative color acquisition unit 220 (FIG. 2) is representative color RCa. In this case, the decorative image generating unit 230 (FIG. 2) converts the hue value 316 of the frame image FPx to the hue value of the representative color RCa. Because the lightness and saturation of the pixels in the frame image FPx are not modified, the resulting frame image FP1 and the frame image FPx have the same pattern; only the hue is different. Similarly, only the hue value 316 of the frame image FPx is modified to the hue value of the representative color RCb to generate the frame image FP2 (FIG. 4(c)).

The hue of the representative color of the frame image FP thus generated according to the representative color RC of the input image is the same as the hue of the representative color RC of the input image. The frame image FP that is to be added to the input image will thus not have a jarring effect when combined with the input image IP. Because a plurality of decorative images with different hues but the same pattern can be represented by the data for a single decorative image, it can be stored on recording media with a limited capacity for storing greater volumes of decorative image data FD.

B. Second Embodiment

Figure 5A:
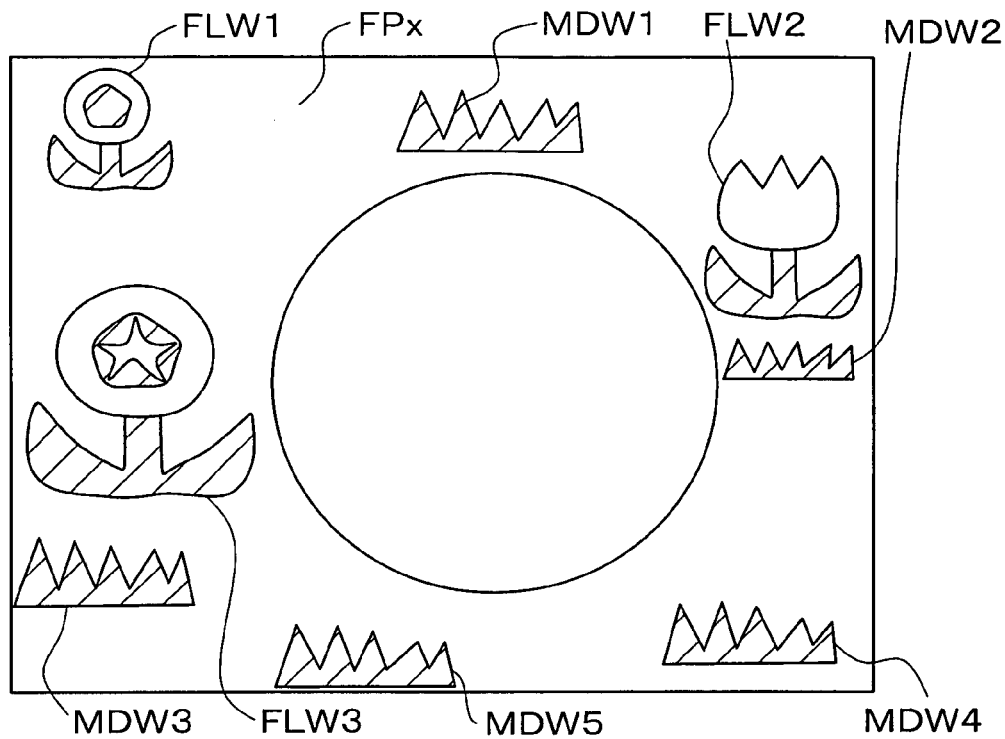
FIGS. 5(a) and 5(b) illustrate decorative images generated from the decorative image data FD in a second embodiment.
Figure 5B:
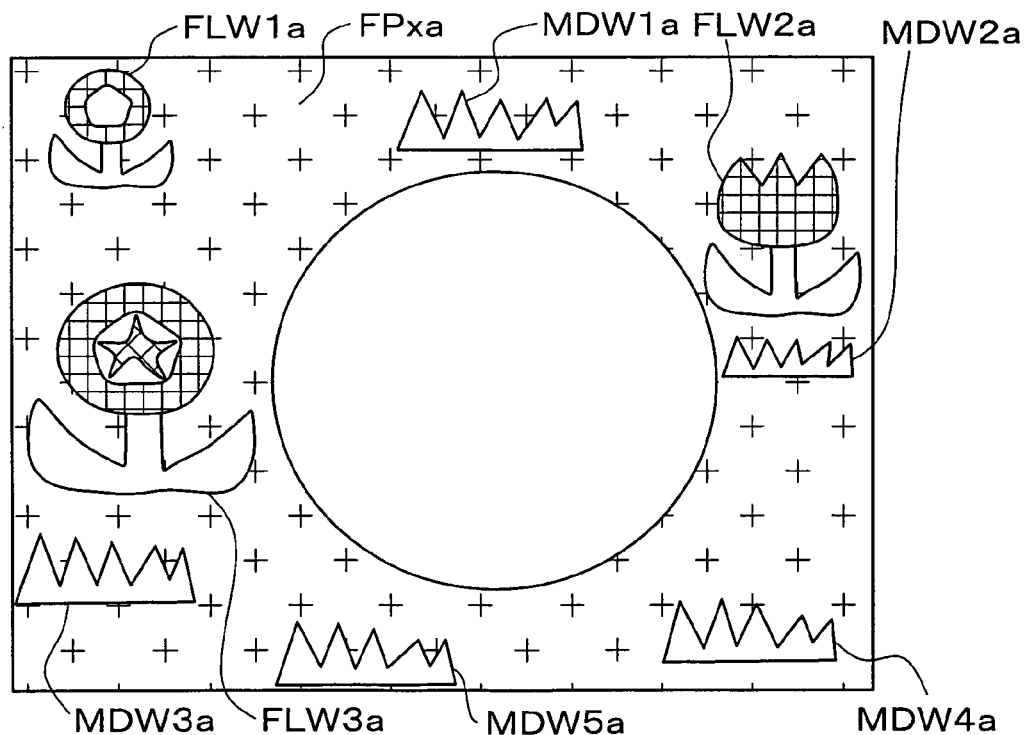

FIGS. 5(a) and 5(b) illustrate decorative images generated from the decorative image data FD in a second embodiment. The decorative image (FIG. 5(a)) represented by the decorative image data FD has a frame image FPx, three flower object images FLW1, FLW2, and FLW3 which are color element images in bit map format, and five grass object images MDW1 through MDW5. The frame image FPx has a pattern, but this is not illustrated in FIG. 5(a). In this embodiment, the frame image FPx means the image serving as background to the object images.

FIG. 6(a) illustrates an example of the data structure 300a of the decorative image data FD representing a decorative image such as shown in FIG. 5(a). The data structure 300a in the second embodiment differs from the data structure 300 in the first embodiment in that it also comprises object data 500 for representing object images FLW1 through FLW3 and MDW1 through MDW5 in addition to the data 312 through 320, 402, and 404 for representing the frame image FP. The location where the object data 500 is stored is represented by the object data offset 322 stored in the header 302a.

As illustrated in FIG. 6(b), the object data 500 comprises the number of objects or object count 502 and n pieces of object data 510, 530, and so forth for representing n pieces of object images. The first object data 510 stores the locations 512 of the objects in the decorative image, the image width 514 of the objects, the image height 516 of the objects, the HSV component data 518, 520, and 522 of the object images, and the mask data 524 indicating whether the colors of each pixel in the object images can be modified or not. The HSV component data 518, 520, and 522 and the mask data 524 are stored in bit map format. The data of the other objects also stores the same data as the first object data.

In the data for the first object, modification inhibiting bits MIB are attached to the heads of the object location 512, image width 514, image height 516, and HSV component data 518, 520, and 522. In the example in FIG. 6(b), because the modification inhibiting bits MIB of the object location 512, image width 514, and image height 516 are 1 (unmodifiable), the location, image width, and image height of object 1 cannot be modified. Because the modification inhibiting bit MIB of the data 518 for the H component is 0 (modifiable) and the modification inhibiting bits MIB of the data 520 and 522 for the S and V components are 1 (unmodifiable), the hue can be modified, whereas the saturation and brightness cannot.

The shaded areas in FIG. 5(a) indicate areas among the various object images where color modification are inhibited by the mask data. For example, the color in the leaf area and center of the flower in object image FLW1 cannot be modified, and the color of the outer periphery of the flower can be modified. In object image MDW1, the color of the entire image cannot be modified. It is thus evident that the color of some object images can be modified in their entirety, and that the color of parts of other object images can be modified.

In areas where the color modification are inhibited by the mask data, the color stored in the decorative image data FD is used without being modified. In areas where the color modification are permitted by the mask data in the object images, the color may be modified to the representative color of the input image IP in each image.

Figure 7A:
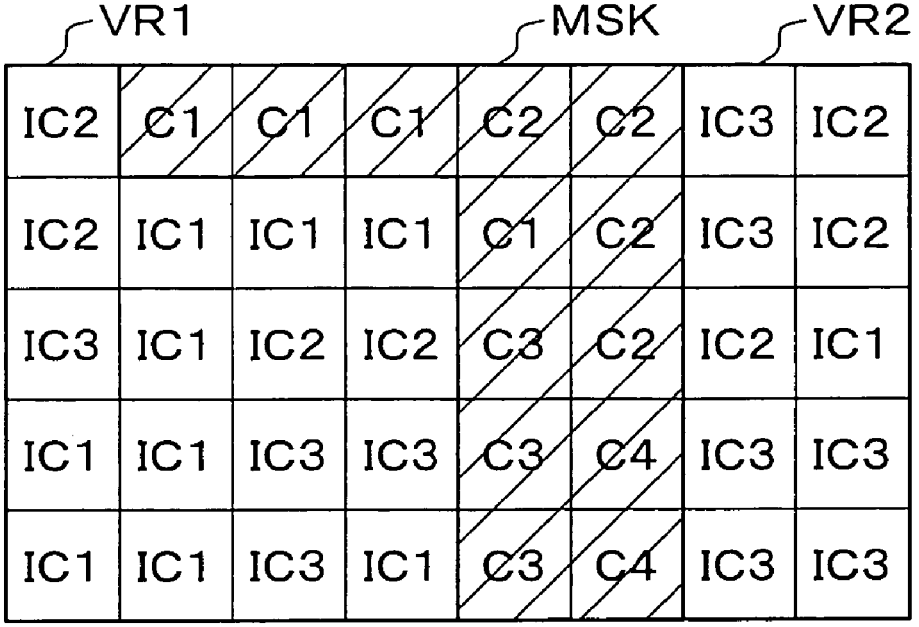
FIGS. 7(a) and 7(b) illustrate changes in color in the second embodiment.
Figure 7B:
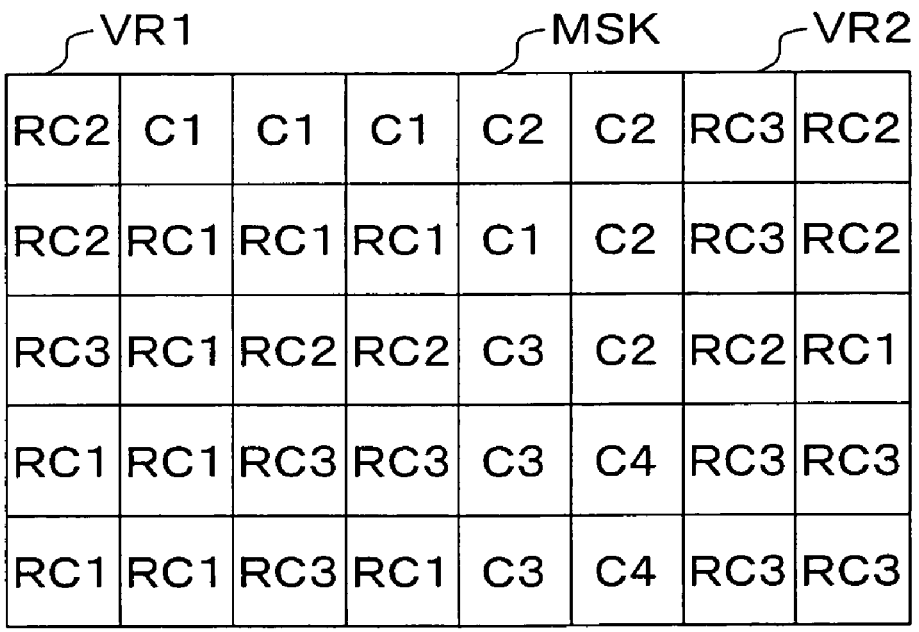

FIGS. 7(a) and 7(b) illustrate changes in color in the second embodiment. FIG. 7(a) shows some of the bit map data for object images. Areas with 8×5 pixels are composed of three areas: an shaded area MSK in FIG. 7(a) where the color modification is inhibited by the mask data, and areas VR1 and VR2 where the color can be modified. The symbols attached to each pixel indicate color data stored in each pixel before color modification.

In the example in FIG. 7(a), the actual colors C1 to C4 of the object image pixels are stored in the pixels of the area MSK. On the other hand, the color numbers IC1 through IC3 of the pixels are stored in the pixels of areas VR1 and VR2. Because three kinds of color numbers are stored in the pixels of areas VR1 and VR2, the decorative image generating unit 230 (FIG. 2) acquires three representative colors RC1 through RC3 for the input image from the representative color acquisition unit 220 (FIG. 2). As illustrated in FIG. 7(b), the colors of the pixels of the object image are modified to one of the representative colors among the plurality of representative colors RC1 through RC3 for the color numbers IC1 through IC3.

The object images FLW1a through FLW3a and MDW1a through MDW5a in which the colors have thus been modified are placed on the frame image FPxa in which the color has been modified according to the object location, image width, and image height stored in the object data 510, 530, and the like. FIG. 5(b) indicates a decorative image FP in which the colors have thus been modified. The cross hatched areas in FIG. 5(b) indicate the part in the decorative image FP where the color has been modified.

The data structure of the decorative image data FD can be done as indicated in the second embodiment to represent complex decorative images with decorative image data of a smaller file size. The representative colors of the objects serving as the main parts of the decorative image can be modified based on the representative color of the input image, thus permitting the generation of decorative images which will not have a jarring effect when combined with an input image.

C. Third Embodiment

FIG. 8(a) illustrates an example of the data structure 300b of decorative image data FD in a third embodiment. This differs from the data structure 300a in the second embodiment in that diagram data 600 representing a vector diagram (referred to simply as "diagram" below) is stored as the color element image instead of object data 500. As the structure is otherwise virtually the same as in the second embodiment, they will not be further elaborated.

As illustrated in FIG. 8(b), the diagram data 600 comprises the number of diagrams 602 and n pieces of data 610, 630, and so forth relating to n pieces of diagrams. The first diagram data 610 stores the diagram location 612, diagram image width 614, diagram image height 61, standard color 619 of the diagram, and profile data 620 representing the diagram profile. The data for the other diagrams stores the same data as the first diagram data.

Modification inhibiting bits MIB are attached to the heads of the diagram location 612, image width 614, image height 616, and standard diagram color 618 in the first diagram data. In the examples in FIG. 8(b), the modification inhibiting bits MIB of the diagram location 612, image width 614, and image height 616 are 1 (unmodifiable), and the location, image width, and image height of the diagram 1 therefore cannot be modified. The modification inhibiting bit MIB in the standard diagram color 618, on the other hand, is 0 (modifiable), and the color of the diagram can therefore be modified.

Figure 9A:
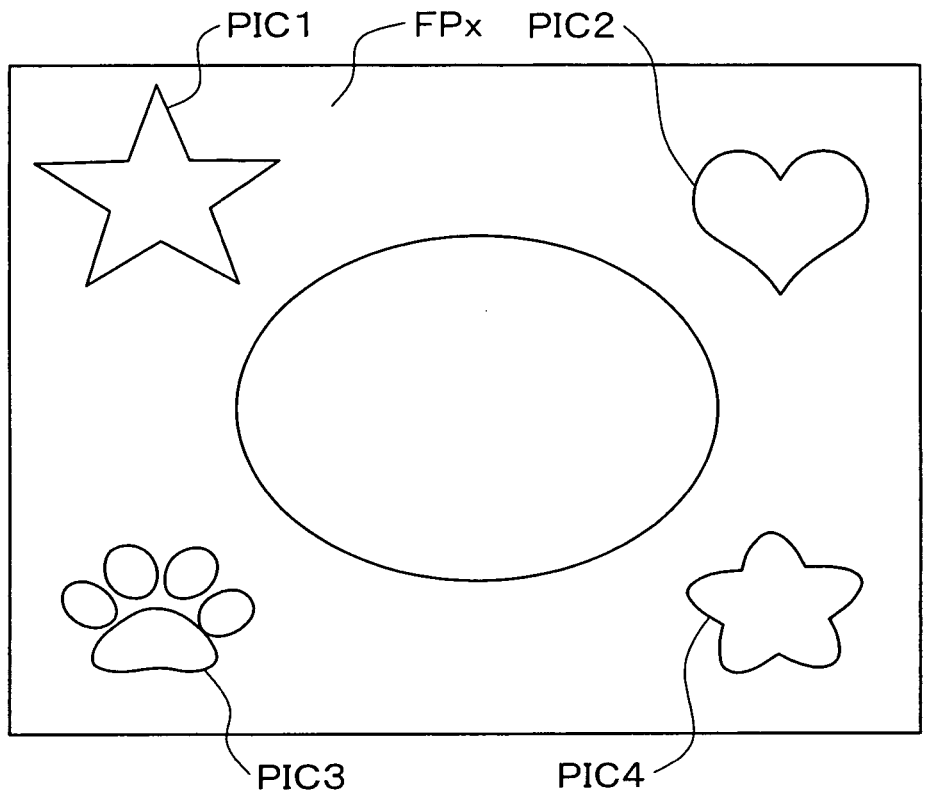
FIGS. 9(a) and 9(b) illustrate the generation of a decorative image from the decorative image data FD in the third embodiment.
Figure 9B:
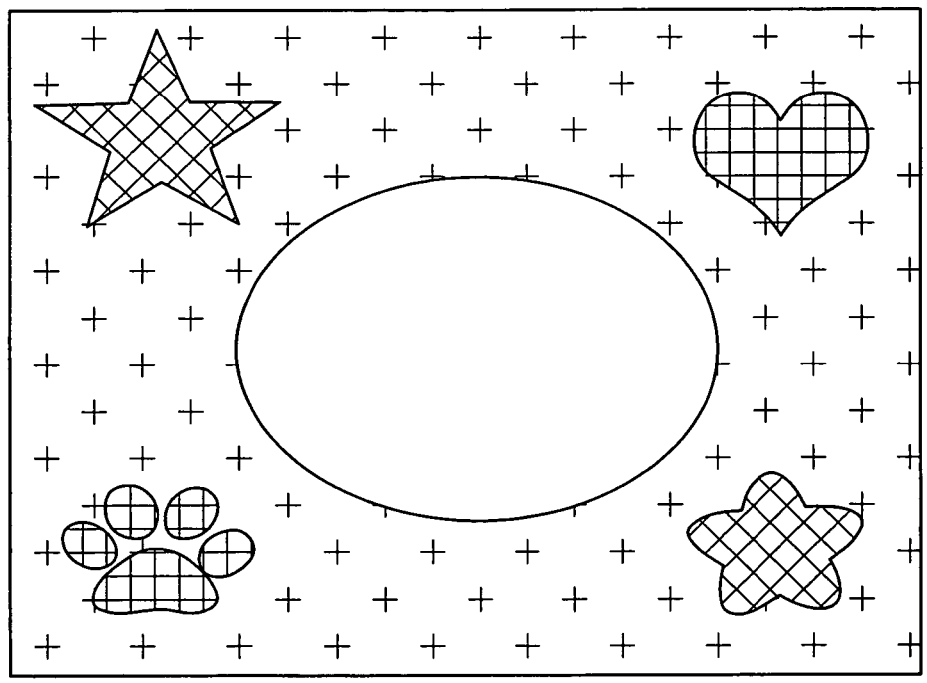

FIGS. 9(a) and 9(b) illustrate the generation of a decorative image from the decorative image data FD in the third embodiment. The decorative image (FIG. 9(a)) represented by the decorative image data FD has a frame image FPx and four diagrams PIC1 through PIC4 as color element images. The frame image FPx and four diagram element images PIC1 through PIC4 are set so that only the colors can be modified. The frame image FPx has a pattern, but it is not illustrated in FIG. 9(a).

In the example in FIG. 9(a), the areas where the color can be modified are the five areas in the frame image FPx and diagrams PIC1 through PIC4. The decorative image generating unit 230 (FIG. 2) acquires representative colors for a plurality of input images IP. The five areas are colored in with representative colors closes to the standard diagram color and hue of each. The cross hatched areas in FIG. 9(b) indicate objects which have thus been colored in with the representative colors of the input images IP. In the third embodiment, the color to be filled in is determined for each of diagrams PIC1 through PIC4, but all the diagrams may also be colored in with the same color. In such cases, the representative colors of the input images IP acquired by the decorative image generating unit 230 are two colors: the representative color suitable for the frame image FPx and the representative color suitable for the diagrams PIC1 through PIC4.

Complex decorative images can be represented by decorative image data of smaller file size even when the decorative image data FD is constructed as described in the third embodiment. Because the representative colors of the main parts of the decorative image are modified based on the representative color of the input image, decorative images can be generated without producing a jarring effect when combined with the input image.

D. Acquisition of Representative Colors

Figure 10:
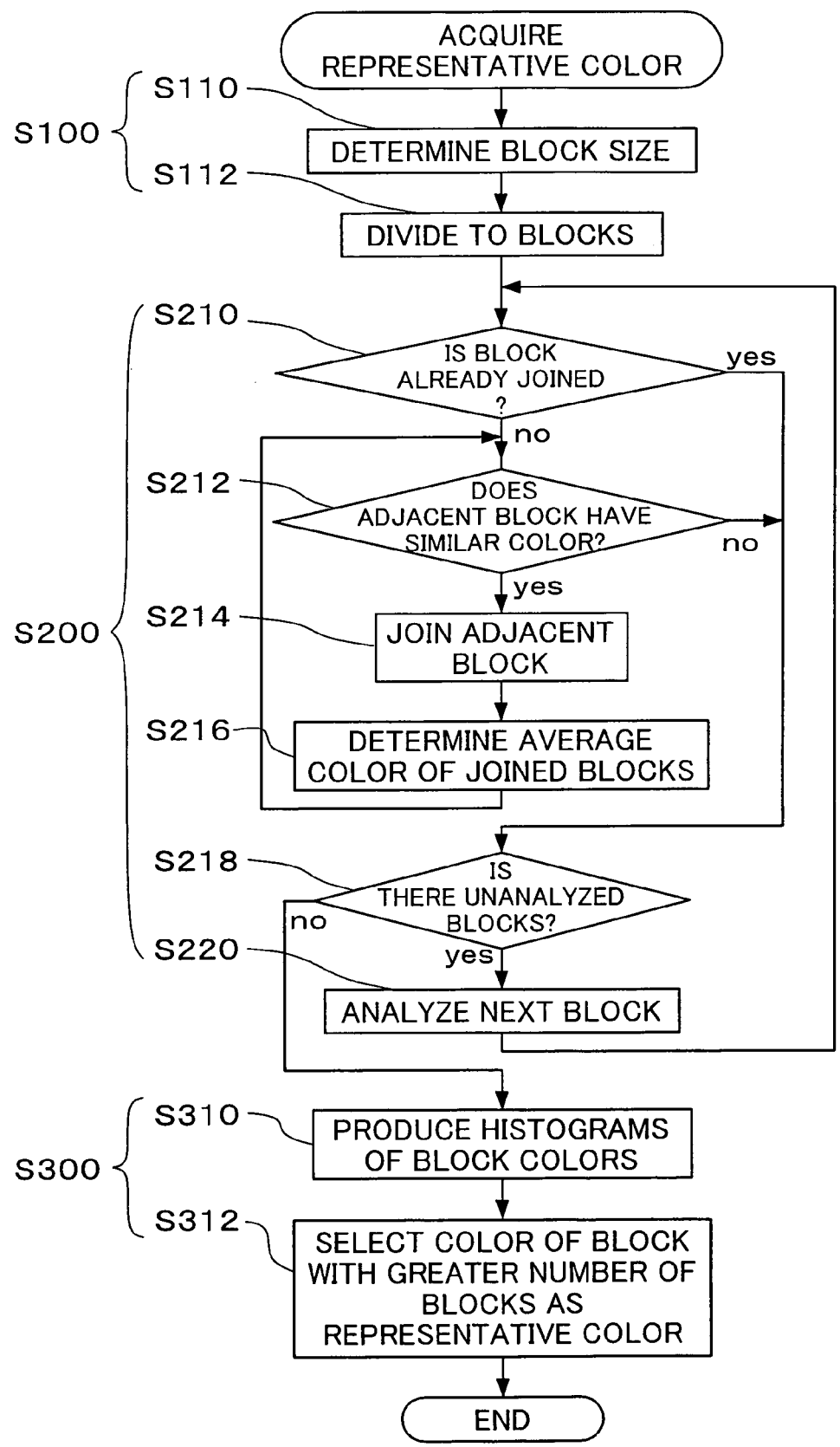
FIG. 10 is a flow chart of an example for acquiring representative colors.

FIG. 10 is a flow chart of an example for acquiring a representative color. FIGS. 11(a) through 11(e) illustrate the details of the process.

The representative color RC of input image IP is acquired by carrying out a pre-processing step S100, image analysis Step S200, and representative color determination Step S300, in that order. In Step S100, the input image IP is divided into a number of areas (referred to below as "blocks") suitable of image analysis. In Step S200, the input image IP is analyzed by each block thus divided, and in Step S300, the representative color RC is determined based on the results of the analysis in Step S200.

In Step S110, the image size of the input image IP is obtained, and the size of the blocks is determined according to the size of the input image IP. It is determined whether the number of horizontal pixels or the number of vertical pixels in the input image IP is smaller, and the block size is determined with reference to a table showing the correspondence between block size and the smaller pixel number, which is provided in the image processing apparatus 200. In the example in FIG. 11(a), the entire input image IP is divided into 7×6 blocks. These divided blocks are referred to as the "source blocks." As used in the present Specification, "size" means the size of the image represented by the number of pixels in the horizontal and vertical directions.

In Step S112, the input image IP is divided into the blocks with sizes determined in Step S110. The average color of pixels included in each block is then calculated for each of the divided blocks, and the average color is regarded as the color which each block has (referred to below as "block colors"). FIG. 11(a) illustrates the block color (1 letter and 1 number) calculated for each block. In FIGS. 11(a) through 11(e), block colors in which the first letter of the block colors represented by 2 characters is the same are similar colors, and block colors in which the first letter of the block color is different are not similar colors. In this embodiment, "similar colors" refers to colors in which differences of hue (H) in the HSV color space are within a certain range (such as 30°).

The blocks into which the input image IP has been divided in the pre-processing Step S100 are analyzed in sequence in the image analysis Step S200. Image analysis is done by joining adjacent blocks in which the block color is similar, and determining the number of source blocks belonging to the joined block.

In Step S210, it is determined whether the block being analyzed (referred to below as "target block") is a joined block. If the target block is a joined one, the process advances to Step S218. If the target block is not a joined one, the process moves to S212 to analyze the target block. In the example in FIG. 11(a), block L11 is the first target block after the image has been divided into blocks, and the block L11 is thus not joined. Block L11 is therefore analyzed in Step S212 and thereafter.

In Step S212, it is determined whether the block color of the target block and the block color of a block adjacent to the target block are similar. If the block color of the target block and the block color of an adjacent block are similar (in such cases, the adjacent block is referred to as a "similar block"), the blocks are joined in Step S214. If the block color of the target block and the block color of an adjacent block are not similar, the process advances to Step S218.

In the example in FIG. 11(a), it is determined whether the block colors of the target block L11 and the adjacent blocks L12 and L21 are similar or not. Since block L12 has a block color R2 that is not similar to the target block L11, it is not a similar block and is not joined. Block L21, on the other hand, has the same block color G1 as the target block L11, and is thus determined to be a similar block which can be joined.

In Step S214, the target block and similar block are joined, forming a single block. In Step S216, the average color of the joined blocks is calculated. The average color of the joined blocks is a color in which the RGB components are the average values obtained when the RGB components of the target block and similar block have been weighted with the number of source blocks belonging to the target block and similar block, respectively.

In the example in FIG. 11(b), the target block L11 and similar block L21 are joined into a single block CL1. The block color of the joined block CL1 is the mean color of the block colors of the source blocks L11 and L21. In FIG. 11(b), the block colors which the source blocks L1 and L2 have in block CL1 are the same color G1, and the block color of the joined block CL1 is thus G1.

After the blocks have been joined, the process returns to Step S212. The joined block is the target block, and it is determined whether the block colors of the adjacent blocks are similar to the block color of the target block or not. Steps S212, S214, and S216 are repeated until the block colors of adjacent blocks are not similar to the block color of the target block.

FIG. 11(c) illustrates the joining of block L22 which has a block color G2 and is adjacent to block CL1. As illustrated in FIG. 11(c), block L22 which is similar to block CL1 is also joined, forming a single joined block CL1a. The block color of the joined block CL1a is color GA, in which the RGB components are the average values obtained by weighting block colors G1 and G2 2-to-1.

When the block colors of the target block and adjacent blocks are not similar, Step S218 is executed. In Step S218, it is determined if there are any unanalyzed blocks. When there are unanalyzed blocks, the unanalyzed block becomes the target block by means of Step S220. Step S210 is then executed to analyze unanalyzed blocks.

The block joining process is repeated so that the source blocks (FIG. 11(a)) are reorganized as shown in FIG. 11(d). In FIG. 11(d), block colors indicated by 2 characters represent weighted average colors determined during the joining of blocks.

In Step S218, when it is determined that there are no unanalyzed blocks, the process moves to Step S310. In Step S310, a histogram is produced of the number of source blocks belonging to each block of the joined blocks. In Step S312, the histograms that have been produced are referenced to select a predetermined number of joined blocks with a greater number of source blocks. The block color(s) of the predetermined number of joined blocks thus selected is regarded as being the representative color of the input image IP. In this embodiment, the number of joined blocks selected is 1, but the number may be any number of 2 or more.

FIG. 11(e) shows the number of source blocks belonging to each joined block in the form of histograms. In this example, as illustrated in FIG. 11(e), the block with the greatest number of source blocks is the block with block color RB. The block color RB of the block with the greatest number of source blocks is thus the representative color RC of the input image IP.

This method for obtaining the representative color permits the detection of various areas in which the hue of the input image IP is different. In consequence, a representative color which properly characterizes an input image can be obtained. In addition a plurality of representative colors can be obtained from an input image.

E. Variants

The invention is not limited to the above examples or embodiments, and can be realized in a variety of embodiments within the scope of the invention. For example, the following variants are also possible.

E1. Variant 1:
In the above embodiments, the image processing apparatus 200 comprises a decorative image storage unit 260 for storing data FD for a plurality of decorative images, but the decorative image storage unit 260 may be provided by a server or the like connected to a computer network, such as the Internet.

E2. Variant 2:
In the above embodiments, the unmodifiable attributes of image representation objects are represented by modification inhibiting bits MIB embedded in parameters related to the image representation objects, but anything that makes it possible to determine whether or not image representation data can be modified based on the decorative image data FD can be used. For example, unmodifiable attributes may be stored in any part of the decorative image data FD. It may also be determined whether or not they can be modified by the location of the image representation data in the decorative image data not by explicit data.

E3. Variant 3:
In the above embodiments, the color of the color image elements is determined in such a way that the hue of the representative color of the decorative image FP comes close to the hue of the representative color RC of the input image IP, but anything that produces no jarring effect when the decorative image FP is combined with the input image IP may be used. For example, a database related to the color scheme can be used to determine the color scheme of the color element images so that the combination of the representative color of the decorative image FP and the representative color RC of the input image IP results in a desirable color scheme.

E4. Variant 4:
In the above embodiment, the hue of the frame image FPx is modifiable, whereas the lightness and saturation are not, but anything that does not produce a jarring effect when the frame image FP is combined with the input image IP may be used.

E5. Variant 5:
In the second and third embodiments, the location as well as the image width and height of the objects and diagrams are not modifiable, but anything that allows the objects or diagrams to be disposed in a suitable setting may be used. For example, the location of the objects may be modified, so that the objects are laced in a desired setting around the decorative image.

E6. Variant 6:
In the second and third embodiments, the decorative image represented by the decorative image data FD had a frame image FPx, but the decorative image FP may be any with at least one color image element. For example, the decorative image FP may be produced with just an object and no frame image FPx.

E7. Variant 7:
In the second and third embodiments, all colors are modifiable in the frame image FPx and object images or diagrams, but it is also possible to modify just either of the frame image FPx and the object image(s) or either of the frame image and the diagram(s). In such cases, the decorative image generating unit 230 (FIG. 2) may acquire at least one representative color of the input image IP.

E8. Variant 8:
In the above embodiments, HSV component values are used to modify the colors of the decorative image, but the component values of any color system suitable for modifying the colors of decorative images may be used. In such cases, it is desirable to employ a color system making use of one component for representing lightness and two components for representing hue and saturation or croma. For example, in the YUV color system, it is possible that the Y component representing luminance would not be modified, and at least one component other than the luminance could be modified. Two color difference components or the like may be used as the two components representing hue and saturation.

E9. Variant 9:
In the above embodiments, blocks with similar block colors are integrated, and the representative color(s) is determined on the basis of the number of source blocks belonging to the integrated blocks, but the representative color may be any color characteristic of the input image. For example, the blocks may be categorized based on classification rules, and the representative color can be determined based on the number of blocks belonging to the category.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing method for adding a decorative image to an input image, comprising:
   (a) preparing decorative image data with a certain data structure, for representing the decorative image;
   (b) acquiring a representative color of the input image by analyzing image data representing the input image; and
   (c) generating, according to the representative color, a decorative image by modifying color element image data that is included in the decorative image data and that represents a color element image, the color element image being a color image constituting at least a partial area of the decorative image, wherein
   the certain data structure includes a color element image storage portion for storing the color element image data,
   the color element image data includes a plurality of image representation components, and
   the color element image storage portion stores a non-rewritable attribute representing whether modification of the image representation components for at least one color element image is permitted.

2. An image processing apparatus for adding a decorative image to an input image, comprising:
   a decorative image storage unit configured to store decorative image data with a certain data structure for representing the decorative image;
   a representative color acquisition unit configured to acquire a representative color of the input image by analyzing the input image; and
   a decorative image generating unit configured to generate, according to the representative color, a decorative image by modifying a color element image data that is included in the decorative image data and that represents a color element image, the color element image being a color image constituting at least a partial area of the decorative image, wherein the certain data structure includes a color element image storage portion for storing the color element image data, the color element image data includes a plurality of image representation components, and the color element image storage portion stores a non-rewritable attribute representing whether modification of the plurality of image representation components for at least one color element image is permitted.

3. A computer program product for adding a decorative image to an input image, comprising:

a computer-readable storage medium; and a computer program stored on the computer-readable storage medium, the computer program includes:

a first program for causing a computer to acquire decorative image data with a certain data structure for representing the decorative image from a decorative image storage unit;

a second program for causing the computer to acquire a representative color of the image by analyzing image data representing the input image; and a third program for causing the computer to generate a decorative image by setting an attribute of an element image of the decorative image according to the representative color, the certain data structure includes a color element image storage portion for storing color element image data representing a color element image constituting at least partial area of the decorative image, the color element image data includes a plurality of image representation components, and the color element image storage portion stores a non-rewritable attribute representing whether modification of the image representation components for at least one color element image is permitted.

4. An image output apparatus for outputting an output image generated by addition of a decorative image to an input image, comprising:

a decorative image storage unit configured to store decorative image data with a certain data structure for representing the decorative image;

a representative color acquisition unit configured to acquire a representative color of the input image by analyzing the input image; and a decorative image generating unit configured to generate, according to the representative color, a decorative image by modifying color element image data that is included in the decorative image data and that represents a color element image being a color image constituting at least a partial area of the decorative image, wherein the certain data structure includes a color element image storage portion for storing the color element image data, the color element image data includes a plurality of image representation components, and the color element image storage portion stores a non-rewritable attribute representing whether modification of the image representation components for at least one color element image is permitted.

5. An image output apparatus according to claim 4, wherein the plurality of image representation components include a first component for representing lightness distribution of the color element image, and second and third components for representing hue and saturation of the color element image, and the attribute representing whether the modification is permitted indicates that at least one of the first through third components modifiable, and that at least one remaining component is unmodifiable.

6. An image output apparatus according to claim 5, wherein the attribute representing whether the modification is permitted indicates that the first component is unmodifiable, and that at least one of the second and third components is modifiable.

7. An image output apparatus according to claim 4, wherein the color element image data has a bit map image data format, and the attribute representing whether the modification is permitted includes mask data indicating pixels in the bit map image whose pixel values are modifiable.

8. An image output apparatus according to claim 4, wherein the color element image data has a vector diagram data format, and the attribute representing whether the modification is permitted indicates whether or not a color of the vector diagram is modifiable.

9. An image output apparatus according to claim 4, wherein the decorative image is represented by single color element image data.

10. An image output apparatus according to claim 4, wherein the decorative image is represented by a plurality of color element images data representing a plurality of objects constituting the decorative image, and at least one color element image data among the plurality of color element image data includes information indicative of arrangement of the color element image represented by the at least one color element image data in the decorative image.

11. An image output apparatus according to claim 10, wherein the at least one color element image data stores a non-rewritable attribute representing whether the information on the arrangement in the decorative image is modifiable by the image output apparatus.

* * * * *